(12) United States Patent
Kellenbach

(10) Patent No.: US 6,236,000 B1
(45) Date of Patent: May 22, 2001

(54) MOUNTING OF GAUGED LOAD BEARING MEMBERS

(76) Inventor: Arthur Kellenbach, 5 Awatea Road, St Ives, N.S.W., 2075 (AU)

( * ) Notice: Subject to any disclaimer, the term of this patent is extended or adjusted under 35 U.S.C. 154(b) by 0 days.

(21) Appl. No.: 09/297,938

(22) PCT Filed: Nov. 13, 1997

(86) PCT No.: PCT/AU97/00772

§ 371 Date: May 11, 1999

§ 102(e) Date: May 11, 1999

(87) PCT Pub. No.: WO98/21555

PCT Pub. Date: May 22, 1998

(30) Foreign Application Priority Data

Nov. 13, 1996 (AU) .................................................. PO3574
Dec. 19, 1996 (AU) .................................................. PO4298

(51) Int. Cl.[7] .................................................. G01G 19/08
(52) U.S. Cl. .................... 177/136; 177/139; 177/DIG. 9
(58) Field of Search .................... 177/136, 137, 177/138, 139, 141, DIG. 9

(56) References Cited

U.S. PATENT DOCUMENTS

| | | | |
|---|---|---|---|
| 4,323,132 | * 4/1982 | Bradley | 177/139 |
| 4,824,315 | 4/1989 | Naab et al. | 177/141 |
| 4,854,406 | 8/1989 | Appleton et al. | 177/139 |
| 5,083,624 | 1/1992 | Reichow | 177/139 |
| 5,119,894 | * 6/1992 | Crawford et al. | 177/145 |
| 5,190,116 | 3/1993 | Reichow | 177/211 |
| 5,245,137 | 9/1993 | Bowman et al. | 177/139 |
| 5,703,333 | * 12/1997 | Wegner | 177/139 |
| 5,837,945 | * 11/1998 | Cornwell et al. | 177/136 |
| 5,922,998 | * 7/1999 | Zefira | 177/136 |
| 5,986,560 | * 11/1999 | Rayburn | 177/136 |

FOREIGN PATENT DOCUMENTS

| | | |
|---|---|---|
| 0 452 821 | 10/1991 | (EP) . |
| 0 588 272 | 3/1994 | (EP) . |
| 9201042 | 1/1994 | (NL) . |
| 97/04289 | 2/1997 | (WO) . |

* cited by examiner

*Primary Examiner*—Randy W. Gibson
(74) *Attorney, Agent, or Firm*—Smith, Gambrell & Russell, LLP

(57) ABSTRACT

This invention is drawn to an apparatus for lifting and weighing a container, including a pair of fork tines engagable with said container and mounted on a supporting structure, each fork tine having a vertically disposed web provided with transducers responsive to strain therein to determinate the weight imposed on the tines by the container, characterized in that each tine is attached to the supporting structure by the bolts passing through said web and through a vertical flange located on only one side of said web and attached to the supporting structure.

7 Claims, 2 Drawing Sheets

MOUNTING OF GAUGED LOAD BEARING MEMBERS

FIELD OF THE INVENTION

In International patent application No. WO 94/03784 there are described techniques for the measurement of loads by means of strain gauges located on structures which are not otherwise adapted for load measurement, in which the influence of secondary force on the measurement of the load is compensated by the measurement secondary strain in the structure.

The present invention is directed to improving the performance of such an arrangement in the case of weighing garbage by means of such compensated strain measurement applied to the forks of a garbage skip lifting and transporting vehicle.

BACKGROUND ART

Before the introduction of the approach to weighing which is disclosed in the above-mentioned application, attempts to measure loads in such adverse situations as garbage handling equipment or other hostile weighing environments had followed the conventional wisdom of load cell technology, and devices have been constructed using parallelogram linkages and other complex means of isolating a load cell or cells from spurious strains. None of these approaches has succeeded in achieving sufficiently accurate and repeatable results, with durability.

The methods described in the above-mentioned International application involve a radical approach to the problem of dealing with variations in strain field orientation. In these methods, the primary sensing axis of a principal strain gauge is orientated for response to variation in a principal force, and the effect of secondary forces or secondary strain on the principal gauge is corrected by means of a secondary strain gauge located and orientated so that its response represents the influence of the secondary forces on the response of the principal gauge.

As disclosed in the above application, garbage may be weighed in this way by the application of strain gauges, to the tines of forks employed for the transport of garbage skips. The forks are mounted at their proximal ends on a supporting structure, and a gauging region is provided near the supported end of each fork. In this region a principal strain gauge is formed by a pair of strain gauge elements, one on each side of the flange of the fork, provided with their sensing grids orientated to respond to shear strain and thereby to provide an indication of the load on the fork.

A secondary gauge comprising a second pair of strain gauge elements is also provided, adjacent to the primary gauge, the grids of the secondary gauge being orientated to respond to bending strain and compression or tension strain. The first and second pairs of gauges are connected in respective Wheatstone bridges, and these bridges are interconnected with opposite polarity so that the output of the second gauges opposes that of the first, and the relative influence of the second gauges is adjusted to obtain the required compensation.

SUMMARY OF THE INVENTION

We have found that even with the compensation afforded by the use of the invention disclosed in the above-mentioned application, weight readings obtained by using that method in the case of such garbage truck forks may suffer from a lack of desirable linearity and repeatability.

Investigations of the sources of such repeatability problems have lead us to the discovery that this is due to the methods of mounting of the fork tines which have been used in the prior art. We have found that if the variable orientation of the strain field arising from distortion caused by reaction forces at the mounting end of the fork is stabilised, greatly improved load measurement results are obtained. We have therefore hypothesised that conventional methods of fork mounting, and indeed others which have been adopted as apparently better suited where the forks are to be gauged, have contributed to a lack of repeatability and linearity by introducing shifting strain patterns into the fork from the lifting mechanism.

What we have suprisingly found is that significantly superior results, in terms of the repeatability and linearity of the measurements obtained, are found if the tines are mounted by what is referred to herein as single- sided through bolting, onto a flange fixed to or forming part of the supporting structure. By single-sided through bolting we mean the case where bolts are passed horizontally through the web of the tine and a single flange, the web being thus mounted on this flange solely by such bolting.

The invention therefore resides in apparatus for the lifting and weighing of a container, including a pair of fork tines engagable with said container and mounted on a supporting structure, each fork tine having a vertically disposed web provided with transducers responsive to strain therein to enable the determination of the weight imposed by the container on the tines, characterised in that each tine is attached to the supporting structure by bolts passing through said web and through a vertical flange located on only one side of said web and attached to the supporting structure.

In the case where the supporting structure is a cross bar, a flange may be welded to the cross bar at the desired location of each tine. Where a cross bar mounting is not use, and instead, for example, the tines are to be mounted directly on side members of the lifting structure, the latter will be modified to accommodate the side bolting method used.

The pattern of bolting is preferably such that two lines of bolts are employed, one in each of two quadrants about the cross bar or mounting region. These lines of bolts may be straight or curved, and the axes of the quadrants may be at any angle. In the simplest and preferred form, illustrated herein, a line of bolts is provided respectively above and below the cross bar.

By way of example only the following description deals with several embodiments of the invention illustrated in the drawings. No general description of the weighing system and the transport vehicle with which it intended to be used is given here, as it will be quite familiar to those in the relevant art.

DETAILED DESCRIPTION OF THE PREFERRED EMBODIMENTS

Figure 1:
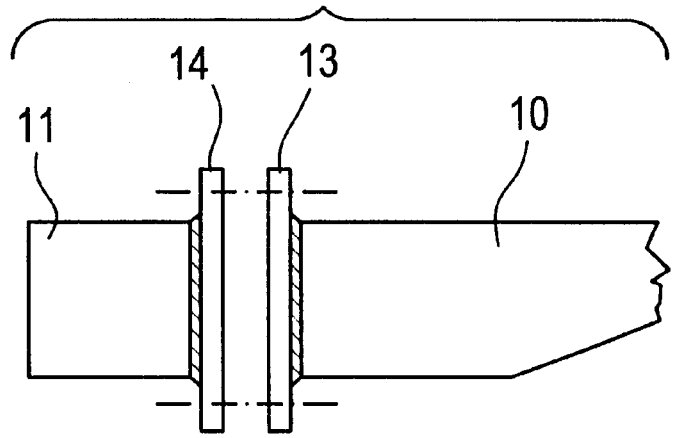
FIG. 1 illustrates in fragmentary side elevation a tine attached by means of opposed flanges.

FIG. 1 shows an arrangement which, although being a straightforward technical solution, we have found to be unsatisfactory. Here each fork tine 10 carries a flange 13 to which it is welded, and this flange is bolted to a similar flange 14 welded to the cross-bar 11. We have found that non-repeatable and non-linear results are obtained, and this is believed to be due to the fact that distortion of the cross-bar will occur readily and strain field variations in the plane of the fork 10 arising from distortion of the cross-bar 11 are readily able to enter the fork. Since furthermore such distortion will vary with variations of bending moment due to variation of the load line of the applied force on the fork, or due to the action of extraneous forces on the fork, these strain field variations will produce non-linear and non-repeatable measurements of the load.

Figure 2:
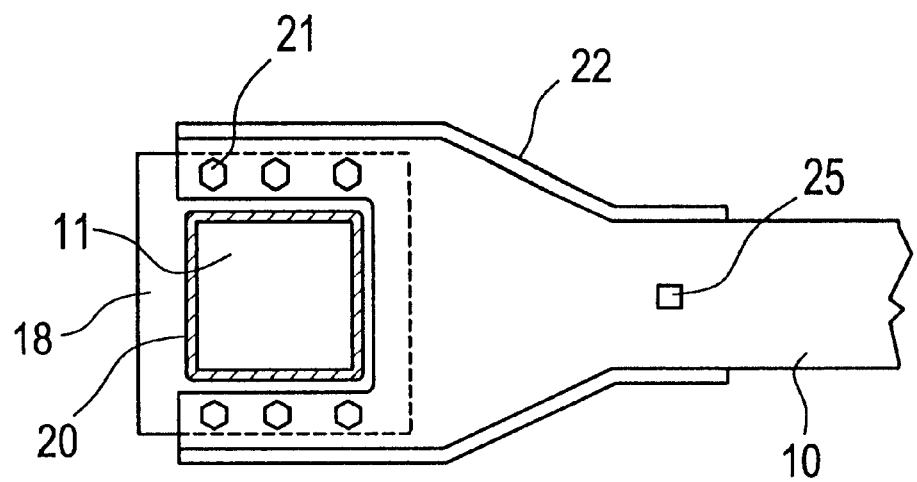
FIG. 2 illustrates in fragmentary side elevation a single sided through bolting method according to a first embodiment of the invention.
Figure 3:
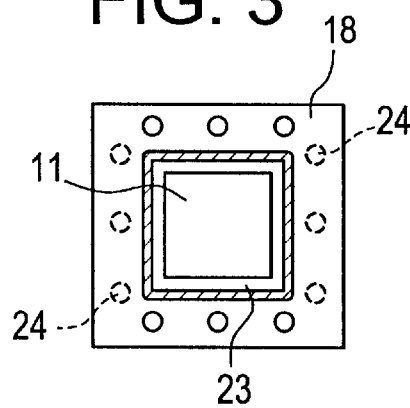
FIG. 3 is a side elevation of a removable mounting device providing for single sided through bolting a according to the invention.
Figure 4:
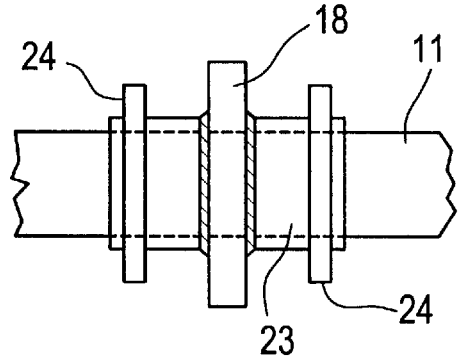
FIG. 4 is an end elevation of the device of FIG. 3 mounted on a cross bar.

Configurations of mounting arrangements in accordance with the invention are shown in FIGS. 2, 3 and 4.

In the FIG. 2 embodiment, for direct fixing to the cross-bar, a flange 18 is welded continuously at 20 on all four sides to the cross-bar 11, and the end of the tine, is through-bolted at 21 to the flange at the top and the bottom. Stiffening flanges 22 are provided on the end region of the tine.

Strain gauges are provided on the web at 25 as described above.

In the embodiment shown in FIGS. 3 and 4, a structure similar to that of FIG. 2 is shown, in this case for a removable mounting. Slidable on the cross-bar 11 is a box member 23 to which is continuously welded a flange 18. The tine 10 is through-bolted to the flange 18 in the same manner as shown in FIG. 2. Additional stiffening flanges 24 may also be provided further to reduce distortion of the box 23.

The lifting mechanisms typically employed on garbage trucks are built as lightly as possible while still being able to lift the required load, and therefore distort considerably with load variations. The flange 18 should therefore be heavy enough so that its inherent stiffness substantially isolates the tine from the distortions which occur in the lifting mechanisms with variations in the load on the fork.

The performance of the arrangements shown in FIGS. 2, 3 and 4 represents a dramatic improvement. It has even been found that load measurements and no-load return readings are unaffected by slackening off the mounting bolts from their recommended torque of 250 lbft to 110 lbft.

Shown in broken lines at 24 in FIG. 3 are other possible locations for bolts mounting the tine to the flange 18. With a suitably shaped end for the tine, bolting could be carried out in any of these regions, but it has been found that best results are achieved if lines of bolts are employed in at least two of the quadrants seen in FIG. 3.

In the FIGS. 3 and 4 embodiments, stiffening members in the plane of the tine are used to minimize distortion before it reaches the tine. In an alternative approach, stiffening is achieved in the mounting end of the tine itself, by increasing the height and/or the thickness of the fork between the mounting and the strain gauges so that the base of the tine acts as a stiffening flange.

Figure 5:
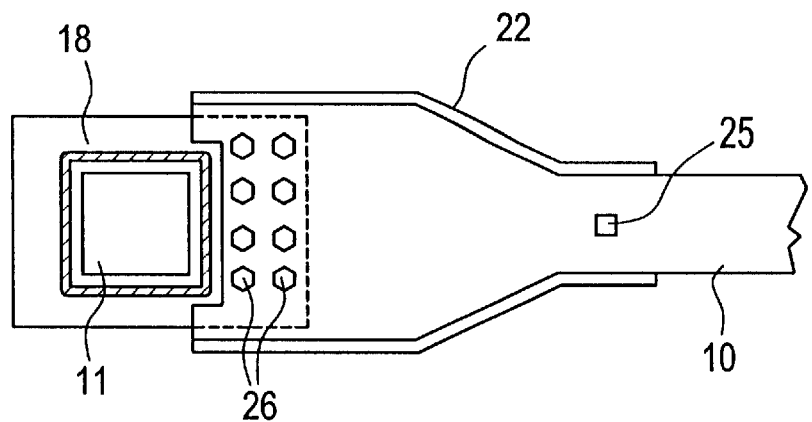
FIG. 5 is a fragmentary side elevation of an alternative embodiment of the invention.

FIG. 5 illustrates an alternative approach to the bolt layout, in which the two lines of bolts 26 are vertical and both located on the side of the flange 18 which faces the tine, that is to say the portion of the flange extending toward the tine.

What is claimed is:

1. Apparatus for the lifting and weighing of a container, including a pair of fork tines engagable with said container and mounted on a supporting structure, each fork tine having a vertically disposed web provided with transducers responsive to strain therein to enable the determination of the weight imposed by the container on the tines, characterised in that each tine is attached to the supporting structure by bolts passing through said web and through a vertical flange located on only one side of said web and attached to the supporting structure.

2. Apparatus according to claim 1 wherein said bolts are provided in at least two of four quadrants when viewed in the direction of the bolt axes.

3. Apparatus according to claim 2, wherein said supporting structure is a crossbar, said locations being disposed about said crossbar.

4. Apparatus according to claim 3 wherein each tine web is provided with a relieved portion for the reception of the crossbar.

5. Apparatus according to claim 4, said locations being a line of bolts located above the crossbar, a line of bolts located below the crossbar, a line of bolts located on the side of the crossbar from which the tine extends, and a line of bolts located at the side of the crossbar opposite the side from which the tine extends.

6. Apparatus according to claim 1 wherein said bolts are provided in two vertical rows in the portion of said web which extends toward said tine.

7. Apparatus for lifting and weighing of a container, including a pair of fork tines engagable with said container and mounted on a supporting structure, each fork tine having a vertically disposed web provided with transducers responsive to strain therein to enable the determination of the weight imposed by the container on the tines, characterized in that each tine is attached to the supporting structure by bolting said web to a vertical flange located on only one side of said web and attached to the supporting structure.

* * * * *